(12) United States Patent
Grötzinger

(10) Patent No.: US 10,825,442 B2
(45) Date of Patent: Nov. 3, 2020

(54) EXHAUST SYSTEM SOUND GENERATION ASSEMBLY UNIT

(71) Applicant: Eberspächer Exhaust Technology GmbH & Co. KG, Neunkirchen (DE)

(72) Inventor: Sven Grötzinger, Nürtingen (DE)

(73) Assignee: Eberspächer Exhaust Technology GmbH & Co. KC, Neunkirchen (DE)

( * ) Notice: Subject to any disclaimer, the term of this patent is extended or adjusted under 35 U.S.C. 154(b) by 58 days.

(21) Appl. No.: 16/013,128

(22) Filed: Jun. 20, 2018

(65) Prior Publication Data

US 2018/0374473 A1    Dec. 27, 2018

(30) Foreign Application Priority Data

Jun. 22, 2017    (DE) .................. 10 2017 113 878

(51) Int. Cl.
*G10K 15/02* (2006.01)
*H04R 1/02* (2006.01)
(Continued)

(52) U.S. Cl.
CPC ............. *G10K 15/02* (2013.01); *F01N 1/065* (2013.01); *F01N 13/1888* (2013.01); *H04R 1/028* (2013.01); *B60K 13/04* (2013.01); *B60Q 5/00* (2013.01); *F01N 1/161* (2013.01); *F01N 2210/02* (2013.01); *F01N 2450/24* (2013.01); *F01N 2450/28* (2013.01); *F01N 2470/14* (2013.01); *F01N 2470/20* (2013.01);
(Continued)

(58) Field of Classification Search
CPC .... G10K 15/02; H04R 1/028; H04R 2499/13; H04R 1/025; H04R 1/2842; B60K 13/04; B60Q 5/00; F01N 13/1888; F01N 1/065; F01N 1/161; F01N 2450/24; F01N 2470/20; F01N 2210/02; F01N 2450/28; F01N 2470/14; F01N 2530/22
USPC ............................................. 381/86
See application file for complete search history.

(56) References Cited

U.S. PATENT DOCUMENTS

| 4,603,890 | A | * | 8/1986 | Huppee | .................. | F16L 33/30 |
| | | | | | | 285/14 |
| 2013/0092471 | A1 | * | 4/2013 | Kruger | ...................... | F01N 1/24 |
| | | | | | | 181/252 |

(Continued)

FOREIGN PATENT DOCUMENTS

| CN | 103114889 A | 5/2013 |
| CN | 104131862 A | 11/2014 |

(Continued)

*Primary Examiner* — Vivian C Chin
*Assistant Examiner* — Douglas J Suthers
(74) *Attorney, Agent, or Firm* — McGlew and Tuttle, P.C.

(57) ABSTRACT

A sound generation assembly unit, for an exhaust system of an internal combustion engine, includes a sound generation module (16) with a sound generation module housing to be arranged at an exhaust gas guide element (12) of the exhaust system (14). At least one loudspeaker unit (20) is arranged in the sound generation module housing (18). A rear volume module (30) includes a rear volume module housing (32) and a rear volume (34) formed in the rear volume module housing (32). The rear volume module housing (32) is connected or can be connected to the sound generation module housing (18) for the acoustic coupling of the rear volume (34) to the at least one loudspeaker unit (20).

17 Claims, 2 Drawing Sheets

(51) Int. Cl.
   *F01N 13/18*   (2010.01)
   *F01N 1/06*    (2006.01)
   *F01N 1/16*    (2006.01)
   *H04R 1/28*    (2006.01)
   *B60K 13/04*   (2006.01)
   *B60Q 5/00*    (2006.01)

(52) U.S. Cl.
   CPC .......... *F01N 2530/22* (2013.01); *H04R 1/025* (2013.01); *H04R 1/2842* (2013.01); *H04R 2499/13* (2013.01)

(56) References Cited

U.S. PATENT DOCUMENTS

| | | | |
|---|---|---|---|
| 2014/0328493 A1* | 11/2014 | Wirth | H04R 1/028 381/86 |
| 2015/0124990 A1 | 5/2015 | Wirth et al. | |

FOREIGN PATENT DOCUMENTS

| | | |
|---|---|---|
| CN | 104696049 A | 6/2015 |
| DE | 10 2009 049 280 A1 | 4/2011 |
| DE | 102011084567 A1 | 4/2013 |
| DE | 10 2013 208186 A1 | 11/2014 |
| DE | 10 2013 222 548 B3 | 2/2015 |
| DE | 10 2013 217849 A1 | 3/2015 |
| DE | 10 2016 107 069 A1 | 10/2017 |
| EP | 0481450 A1 | 4/1992 |
| EP | 2 623 737 A1 | 8/2013 |
| JP | 2013087773 A | 5/2013 |

\* cited by examiner

EXHAUST SYSTEM SOUND GENERATION ASSEMBLY UNIT

CROSS REFERENCE TO RELATED APPLICATIONS

This application claims the benefit of priority under 35 U.S.C. § 119 of German Application 10 2017 113 878.1, filed Jun. 22, 2017, the entire contents of which are incorporated herein by reference.

FIELD OF THE INVENTION

The present invention pertains to a sound generation assembly unit, which can be used, for example, to influence the acoustic characteristic of an exhaust system of an internal combustion engine in a vehicle.

BACKGROUND OF THE INVENTION

Sound generation assembly units, which have at least one loudspeaker unit, are used to influence the acoustic characteristic of an exhaust system. The sound generated by the loudspeaker unit is superimposed to the sound being transported in the exhaust gases due to acoustic coupling of such a loudspeaker unit to the exhaust line especially in the area of a tail pipe. It thus becomes possible to actively design the tone and also to reduce the sound level especially at the opening of an exhaust system.

It is problematic in connection with the integration of such a sound generation assembly unit in a vehicle that the space available for the installation of exhaust systems is already limited and it is often impossible to accommodate an additional assembly unit, namely, such a sound generation assembly unit. It should be borne in mind in this connection, in particular, that the exhaust systems used in different vehicle types and the space made available for installing these may markedly differ from one type of vehicle to another, so that a sound generation assembly unit that is configured or optimized in respect to the configuration of an exhaust system and of the space available for installing same in one vehicle type cannot, in general, be used in other vehicle types.

SUMMARY OF THE INVENTION

An object of the present invention is to provide a sound generation assembly unit for an exhaust system of an internal combustion engine with an expanded range of uses.

This object is accomplished according to the present invention by a sound generation assembly unit for an exhaust system of an internal combustion engine, comprising: a sound generation module with a sound generation module housing to be arranged on an exhaust gas guide element of an exhaust system and at least one loudspeaker unit arranged in the sound generation module housing, and a rear volume module with a rear volume module housing and with a rear volume formed in the rear volume module housing, wherein the rear volume module housing is connected or can be connected to the sound generation module housing for the acoustic coupling of the rear volume to the at least one loudspeaker unit.

It becomes possible due to the modular configuration of the sound generation assembly unit according to the present invention to achieve, on the one hand, an optimized adaptation to the configuration of the exhaust system and to the available installation space with a suitable selection of the modules used for an exhaust system. On the other hand, the acoustic characteristic of an exhaust system can also be adapted to a certain vehicle type in an optimized manner by selecting the module.

A partial rear volume, which is in connection with the rear volume in case of a rear volume module housing coupled acoustically to the sound generation module housing, may be formed in the sound generation module housing.

To make it possible to connect the modules of the sound generation assembly unit according to the present invention to one another in a simple manner, it is proposed that connection formations be provided for the preferably detachable connection of the sound generation module housing to the rear volume module housing at the sound generation module housing and the rear volume module housing.

An especially simple adaptability of the acoustic characteristic can be achieved by the rear volume module housing being of variable shape for changing the shape or/and the size of the rear volume. For example, the rear volume module housing may be configured for this as a preferably flexible tube.

It is proposed in case of a type of configuration advantageous especially because of the stability of the configuration that the rear volume module housing have an essentially undeformable configuration.

The present invention further pertains to a sound generation assembly unit kit, especially for building a sound generation assembly unit according to the present invention, comprising: at least one sound generation module with a sound generation module housing to be arranged on an exhaust gas guide element of an exhaust system and with at least one loudspeaker unit arranged in the sound generation module housing; and a group with at least two different rear volume modules each with a rear volume module housing and with a rear volume formed in the rear volume module housing, wherein each rear volume module housing can be connected to the sound generation module housing of the at least one sound generation module for the acoustic coupling of the rear volume to the at least one loudspeaker unit.

Such a kit, made available, for example, also in the form of a stock of different modules, makes it possible to build sound generation assembly units of greatly different configurations, which are then configured each optimized for a certain vehicle type or a certain exhaust system.

The group of rear volume modules may comprise at least two rear volume modules of different shapes or/and sizes of their rear volumes. As an alternative or in addition, the group of rear volume modules may comprise at least one rear volume module with deformable rear volume module housing.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
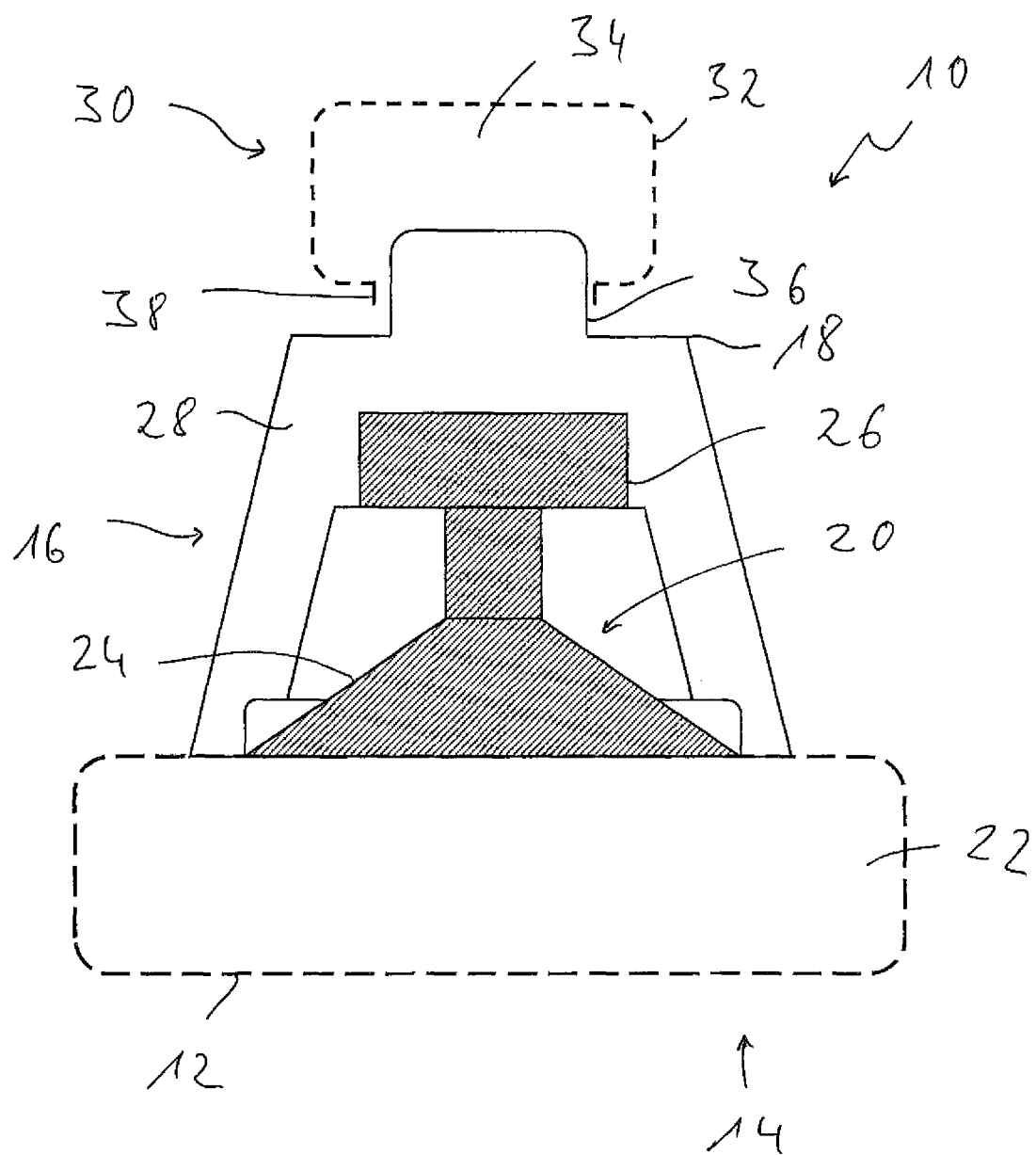
FIG. 1 is a schematic view of a sound generation assembly unit provided at an exhaust system.

Referring to the drawings, FIG. 1 shows a schematic view of a sound generation assembly unit 10, which is arranged at an exhaust gas guide element 12, for example, a tail pipe, of an exhaust system 14 of an internal combustion engine in a vehicle.

The sound generation assembly unit 10 comprises a sound generation module 16 with a sound generation module housing 18, which is arranged at the exhaust gas guide element 12. A loudspeaker unit 20 is arranged in the sound generation module housing 18 such that the sound generated and released by this is radiated into the exhaust gas-carrying volume 22 of the exhaust gas guide element 12 and is thus superimposed to the sound that is being transported and propagates in the exhaust gas flowing in the exhaust gas-carrying volume 22.

The loudspeaker unit 20 comprises a loudspeaker area 24 having a, for example, conventional configuration with a membrane excited to vibrate and an electromagnet area 26, which excites the membrane or membranes of the loudspeaker area 24 to perform vibrations in case of corresponding actuation. At least a part of the loudspeaker unit 20 may be arranged in a partial rear volume 28 formed in the sound generation module housing 18. The size and the shape of this partial rear volume influences the acoustic characteristic of the sound generation module 16.

To make it possible to further influence this acoustic characteristic, the sound generation assembly unit 10 further comprises a rear volume module 30. The rear volume module 30, shown in a schematic view only, comprises a rear volume module housing 32, in which a rear volume 34 is formed. The rear volume module housing 32 is connected to the sound generation module housing 18 such that the rear volume 34 formed in the rear volume module housing 32 is in connection with the partial rear volume 28 formed in the sound generation module housing 18. To establish this connection, an attachment, which is, for example, a pipe branch-like attachment, may provide at the sound generation module housing 18 a connection formation 36, which can be brought into connection with a complementarily shaped connection formation 38 on the rear volume module housing 32, for example, by plugging one into the other. Fastening means, for example, a pipe clamp, adhesive or the like, may be used to establish a stable connection preventing the separation of the rear volume module housing 32. It should be noted that other types of connection, for example, by the use of tube- or flexible tube-like connection elements, may also be used between the two housings 18, 32.

It becomes possible by selecting the shape and size of the rear volume module housing 32 and of the rear volume 34 formed therein to influence the space used for a sound generation assembly unit 10, on the one hand, in order thus to make it possible to adapt this sound generation assembly unit 10 to the installation space conditions available in a vehicle. On the other hand, the shape and size of the rear volume 34 influence the acoustic characteristic of the sound generation assembly unit 10, so that the acoustic characteristic of the sound generation assembly unit 10 can also be adapted to the intended purpose by selecting the shape and the size of the rear volume housing 32 and of the rear volume 34.

Figure 2A:
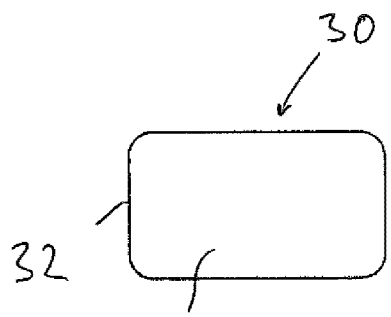
FIG. 2a is a schematic view of a rear volume module with rear volume module housing of one of different sizes.
Figure 2B:
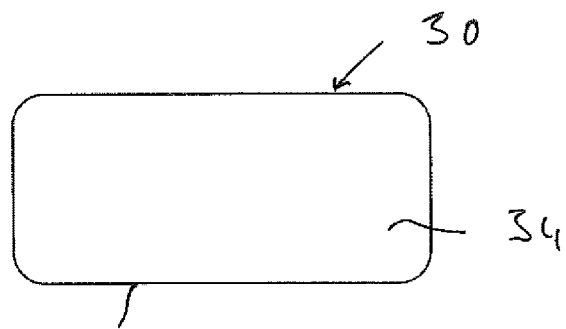
FIG. 2b is a schematic view of a rear volume module with rear volume module housing of another of different sizes.

FIGS. 2 through 4 show in schematic views different possibilities of adapting the rear volume housing 32 and the rear volume 34 to different intended purposes. Thus, FIGS. 2a and 2b show rear volume housings 32 with rear volumes 34 formed therein, which differ basically in terms of size but not in terms of shape. The rear volume modules 30 shown in FIGS. 2a and 2b may each be configured with an essentially rigid, i.e., undeformable rear volume module housing 32.

Figure 3A:
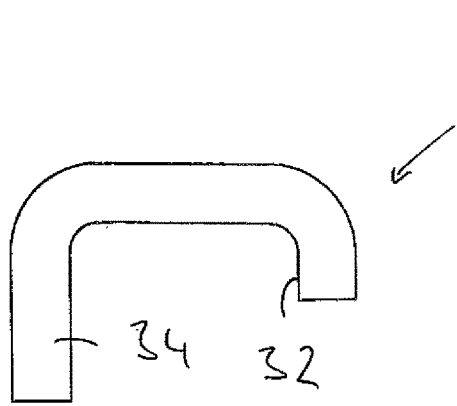
FIG. 3a is a view of a rear volume module with a flexible rear volume module housing brought to one of different shapes.
Figure 3B:
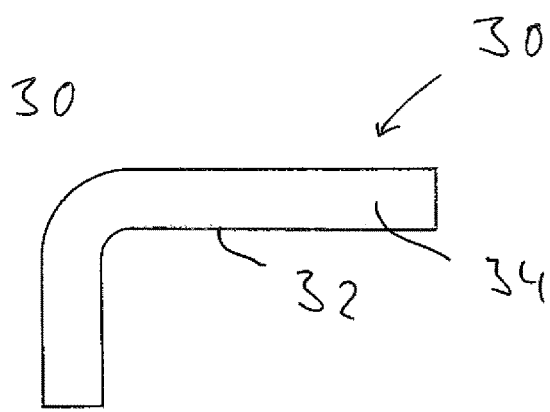
FIG. 3b is a view of a rear volume module with a flexible rear volume module housing brought to another of different shapes.

FIGS. 3a and 3b show a rear volume module 30, which has a variable shape. The rear volume module 30 has a rear volume module housing 32 configured as a flexible tube, i.e., for example, as a plastic or metal tube, with a rear volume 34 formed therein. The acoustic characteristic of the sound generation assembly unit 10 can be influenced by changing the shape of the rear volume module housing 32 and correspondingly also the shape of the rear volume 34 formed therein. Further, the configuration of the rear volume module housing as a flexible, i.e., basically deformable component makes adaptation possible to the shape of the available installation space.

Figure 4A:
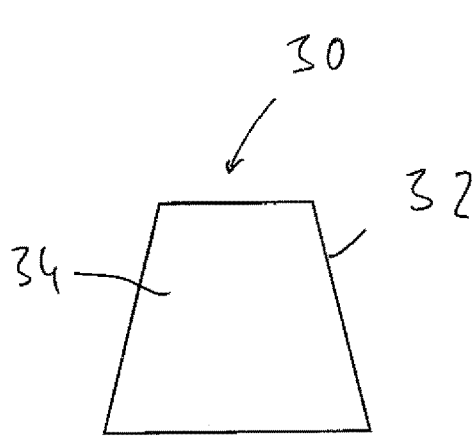
FIG. 4a is a schematic view of a rear volume module with a rear volume module housing of one shape.
Figure 4B:
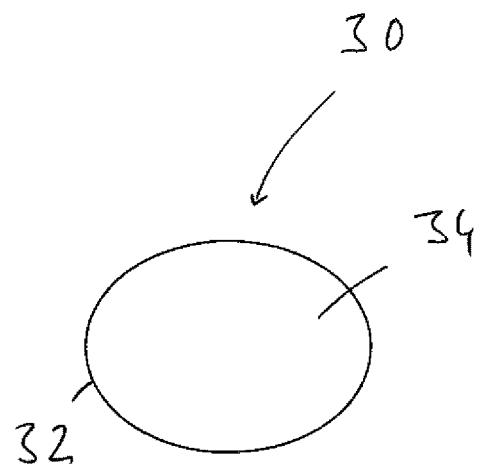
FIG. 4b is a schematic view of a rear volume module with a rear volume module housing of another shape.

Finally, FIGS. 4a and 4b show two rear volume modules 30, which have, for example, rigid, i.e., undeformably configured rear volume module housings 32, independently from the fact that they may also have rear volumes 34 of different sizes. Adaptation to different available installation spaces and different required acoustic characteristics can be achieved in this manner as well.

Due to the provision of a plurality of such rear volume modules with differently configured or/and dimensioned or/and deformable rear volume module housings, it becomes possible to select the suitable rear volume module depending on the required intended purpose and to also connect it to a sound generation module that is also intended for the intended purpose. A plurality of different sound generation modules 16 may also be kept available, which may differ, for example, in the number or also in the dimensioning or in the acoustic characteristic of the loudspeaker units provided therein. It is thus possible with a comparatively small number of modules to be kept available to provide a sound generation assembly unit kit that makes possible a great variability in the configuration of the sound generation assembly units to be produced therewith.

It should finally be noted that, in particular, the rear volume modules may also differ in the materials used to manufacture the rear volume module housings and may differ in whether or how such a rear volume module housing is lined with sound-insulating or sound-reflecting material in some areas.

While specific embodiments of the invention have been shown and described in detail to illustrate the application of the principles of the invention, it will be understood that the invention may be embodied otherwise without departing from such principles.

What is claimed is:

1. A sound generation assembly unit kit, for building a sound generation assembly unit for an exhaust system of an internal combustion engine, the sound generation assembly unit kit, comprising:
  a sound generation module comprising a sound generation module housing to be arranged on an exhaust gas guide element of an exhaust system and a loudspeaker unit arranged in the sound generation module housing, wherein a partial rear volume is provided in the sound generation module housing; and
  a volume modules group comprising at least two different rear volume modules, each one of the at least two different rear volume modules comprising a rear volume module housing with a rear volume formed in the rear volume module housing, wherein the rear volume module housing of each one of the rear volume modules of the volume modules group provides an acoustic characteristic differing from the acoustic characteristic of the rear volume module housing of each other one of the rear volume modules of the volume modules group, wherein, for providing the differing acoustic characteristics, at least one rear volume module of the volume modules differs from at least one other rear volume module of the rear volume modules group in whether or how the rear volume module housing thereof is lined with sound insulating or sound reflecting material, wherein the rear volume module housing of each one of the rear volume modules of the volume modules group is connectable to the sound generation module housing of the sound generation module for an acoustic coupling of the rear volume to the at least one loudspeaker unit, wherein, with the rear volume module housing of one of the rear volume modules acoustically coupled to the sound generation module housing, the partial rear volume is in operative connection with the rear volume of the rear volume module housing of this one of rear volume modules.

2. A sound generation assembly unit kit in accordance with claim 1, wherein:
  the at least two rear volume modules of the volume modules group have different rear volume shapes; or
  the at least two rear volume modules of the volume modules group have different rear volume sizes; or
  the at least two rear volume modules of the volume modules group have different rear volume shapes and different rear volume sizes.

3. A sound generation assembly unit kit in accordance with claim 2, wherein the rear volume module housing of at least one of the at least two rear volume modules of the volume modules group comprises a deformable rear volume module housing.

4. A sound generation assembly unit kit in accordance with claim 1, wherein the rear volume module housing of at least one of the at least two rear volume modules of the volume modules group comprises a deformable rear volume module housing.

5. A sound generation assembly unit kit in accordance with claim 1, wherein the sound generation module housing further comprises connection formations on an exterior of the sound generation module housing for detachably connecting the rear volume module housing of each one of the rear volume modules to the sound generation module housing.

6. A sound generation assembly unit kit, for building a sound generation assembly unit for an exhaust system of an internal combustion engine, the sound generation assembly unit kit, comprising:
  a sound generation module comprising a sound generation module housing to be arranged on an exhaust gas guide element of an exhaust system and a loudspeaker unit arranged in the sound generation module housing, the sound generation module housing comprising a partial rear volume, the sound generation module housing comprising a sound generation module connection formation having a sound generation module connection formation width; and
  a volume modules group comprising at least two different rear volume modules, each one of the at least two different rear volume modules comprising a rear volume module housing with a rear volume formed in the rear volume module housing, the rear volume module housing comprising a rear volume module connection formation defining a rear volume module connection formation opening, the rear volume module connection formation opening comprising an opening width, the opening width being greater than the sound generation module connection formation width, wherein the rear volume module housing of each one of the rear volume modules of the volume modules group provides an acoustic characteristic differing from the acoustic characteristic of the rear volume module housing of each other one of the rear volume modules of the volume modules group, wherein, for providing the differing acoustic characteristics, at least one rear volume module of the volume modules differs from at least one other rear volume module of the rear volume modules group in whether or how the rear volume module housing thereof is lined with sound insulating or sound reflecting material, wherein the rear volume module housing of each one of the rear volume modules of the volume modules group is connectable to the sound generation module housing of the sound generation module via the sound generation module connection formation and the rear volume module connection formation for an acoustic coupling of the rear volume to the at least one loudspeaker unit, wherein, with the rear volume module housing of one of the rear volume modules acoustically coupled to the sound generation module housing, the partial rear volume is in operative connection with the rear volume of the rear volume module housing of this one of rear volume modules.

7. A sound generation assembly unit kit in accordance with claim 6, wherein:
  the at least two rear volume modules of the volume modules group have different rear volume shapes; or
  the at least two rear volume modules of the volume modules group have different rear volume sizes; or
  the at least two rear volume modules of the volume modules group have different rear volume shapes and different rear volume sizes.

8. A sound generation assembly unit kit in accordance with claim 7, wherein the rear volume module housing of at least one of the at least two rear volume modules of the volume modules group comprises a deformable rear volume module housing.

9. A sound generation assembly unit kit in accordance with claim 6, wherein the rear volume module housing of at least one of the at least two rear volume modules of the volume modules group comprises a deformable rear volume module housing.

10. A sound generation assembly unit kit in accordance with claim 6, wherein the sound generation module housing further comprises connection formations on an exterior of the sound generation module housing for detachably connecting the rear volume module housing of each one of the rear volume modules to the sound generation module housing.

11. A sound generation assembly unit kit, for building a sound generation assembly unit for an exhaust system of an internal combustion engine, the sound generation assembly unit kit comprising:
  a sound generation module comprising a sound generation module housing, to be arranged on the exhaust gas guide element of the exhaust system, and at least one loudspeaker unit arranged in the sound generation module housing, the sound generation module comprising a sound generation module connection formation; and
  a first rear volume module comprising a first rear volume module housing with a first rear volume formed in the first rear volume module housing, the first rear volume housing comprising a first rear module housing connection formation defining a first rear module housing connection formation opening, wherein the first rear volume module housing is configured to be connected to the sound generation module housing via the sound generation module connection formation and the first rear module housing connection formation for an acoustic coupling of the first rear volume to the at least one loudspeaker unit;
  a second rear volume module comprising a second rear volume module housing with a second rear volume formed in the second rear volume module housing, the second rear volume housing comprising a second rear module housing connection formation defining a second rear module housing connection formation opening, wherein the second rear volume module housing is configured to be connected to the sound generation module housing via the sound generation module connection formation and the second rear module housing connection formation for an acoustic coupling of the second rear volume to the at least one loudspeaker unit, wherein the first rear volume module housing has an acoustic characteristic that is different from an acoustic characteristic of the second rear volume module housing, wherein an interior of the first rear volume module housing is provided with an amount of sound insulating or sound reflecting material that is different from an amount of sound insulating or sound reflecting material provided in an interior of the second rear volume module housing.

12. A sound generation assembly unit kit in accordance with claim 11, wherein:
  the sound generation module housing forms a partial rear volume; and
  with one of the first rear volume module housing and the second rear volume module housing acoustically coupled to the sound generation module housing, the partial rear volume is in operative connection with one of the first rear volume and the second rear volume.

13. A sound generation assembly unit kit in accordance with claim 11, wherein the sound generation module housing further comprises connection formations on an exterior of the sound generation module housing for detachably connecting one of the first rear volume module housing and the second rear volume housing to the sound generation module housing.

14. A sound generation assembly unit kit in accordance claim 11, wherein the first rear volume module housing and the second rear volume module housing have a variable shape for changing a shape of the first rear volume module housing and the second rear volume module housing or for changing a size of the first rear volume and the second rear volume or for changing a shape of the first rear volume module housing and the second rear volume housing and for changing a size of the first rear volume and the second rear volume.

15. A sound generation assembly unit kit in accordance with claim 11, wherein at least one of the first rear volume module housing and the second rear volume module housing is configured as a flexible tube.

16. A sound generation assembly unit kit in accordance with claim 11, wherein the first rear volume module housing and the second rear volume module housing have an essentially undeformable configuration.

17. A sound generation assembly unit kit in accordance with claim 11, wherein the at least one loudspeaker is configured to be adjacent to exhaust gas guide element.

* * * * *

UNITED STATES PATENT AND TRADEMARK OFFICE
CERTIFICATE OF CORRECTION

PATENT NO. : 10,825,442 B2
APPLICATION NO. : 16/013128
DATED : November 3, 2020
INVENTOR(S) : Sven Grötzinger Page 1 of 1

It is certified that error appears in the above-identified patent and that said Letters Patent is hereby corrected as shown below:

On the Title Page

(73) Assignee should read:
Eberspächer Exhaust Technology
GmbH & Co. KG, Neunkirchen (DE)

Signed and Sealed this
Thirty-first Day of August, 2021

Drew Hirshfeld
*Performing the Functions and Duties of the
Under Secretary of Commerce for Intellectual Property and
Director of the United States Patent and Trademark Office*